INVENTOR.
John M. Tyler
BY Harris G. Luther
ATTORNEY.

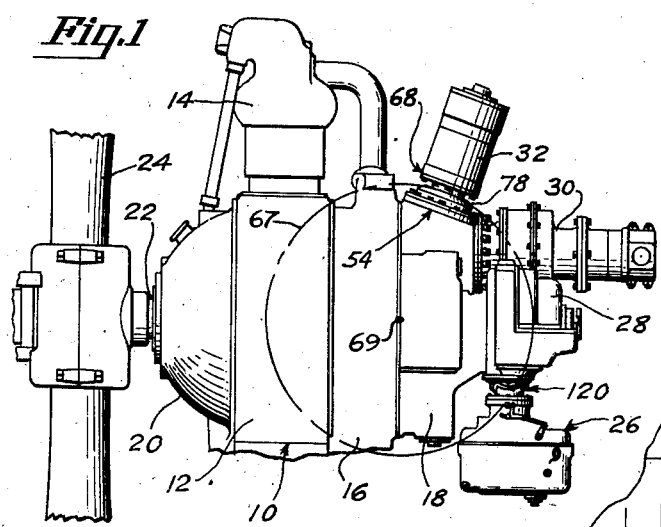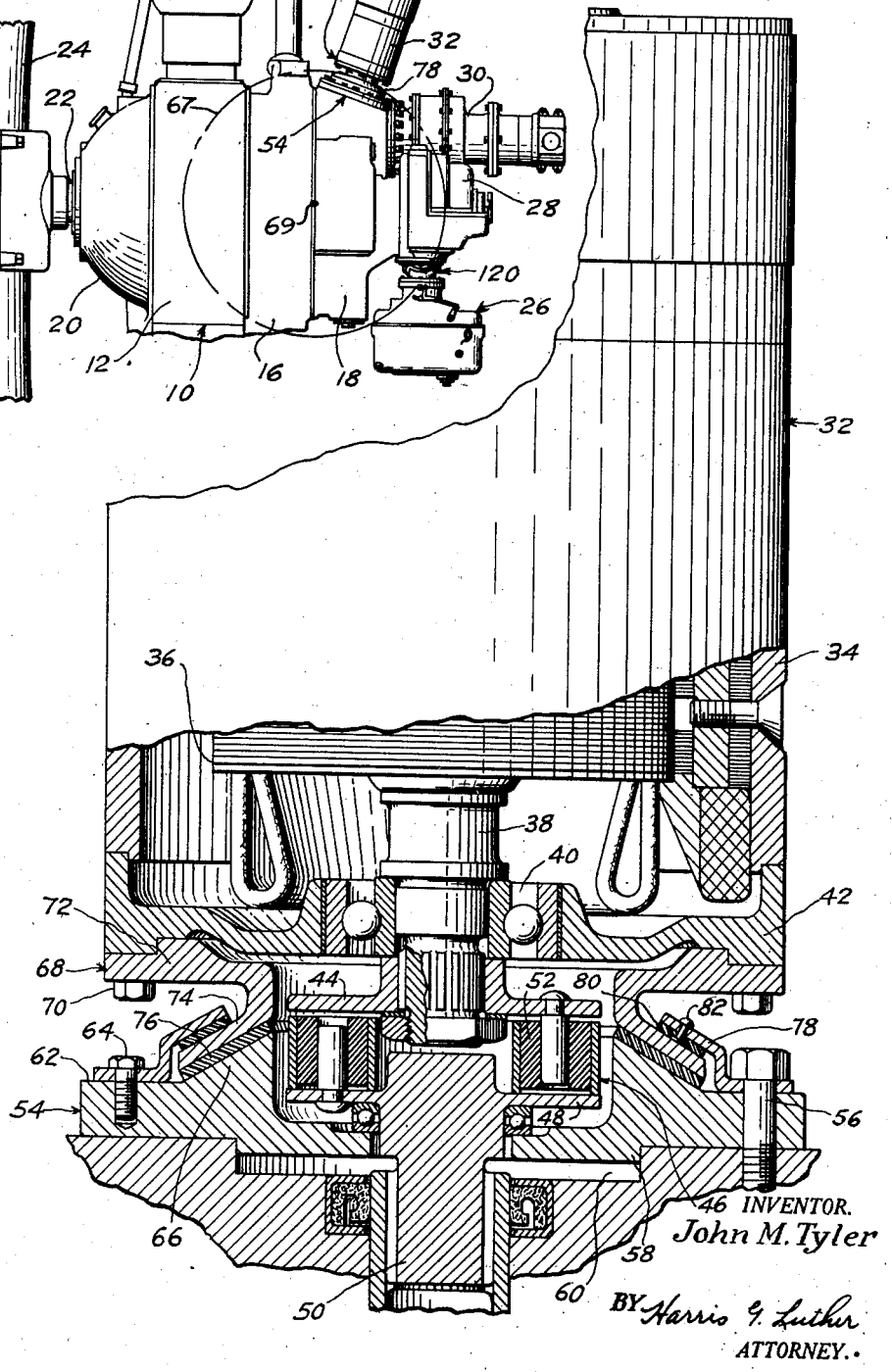

June 3, 1947.  J. M. TYLER  2,421,529
ENGINE ACCESSORY MOUNT
Filed Nov. 13, 1941  3 Sheets-Sheet 3

INVENTOR.
John M. Tyler

BY Harris G. Luther
ATTORNEY.

Patented June 3, 1947

2,421,529

UNITED STATES PATENT OFFICE 2,421,529

ENGINE ACCESSORY MOUNT

John M. Tyler, West Hartford, Conn., assignor to United Aircraft Corporation, East Hartford, Conn., a corporation of Delaware Application November 13, 1941, Serial No. 418,947

18 Claims. (Cl. 248—26)

This invention relates to improvements in vibration suppressing mountings and has particular reference to an improved mounting for securing an engine accessory upon an engine subject to vibrational movements.

An object of the invention resides in the provision of an improved mounting for securing a relatively massive body upon another body subject to vibrational movements adapted to suppress the transmission of vibrational movements between said bodies.

A somewhat more specific object resides in the provision of an improved mounting for an engine accessory arranged to reduce the amplitude of engine vibration by frictionally absorbing a portion of the vibrational energy in the mounting.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention as it will be apparent to those skilled in the art that various changes in the illustrated construction may be resorted to without in any way exceeding the scope of the invention.

In the drawings:

Fig. 1 is a somewhat diagrammatic view of an engine, such as an airplane engine, and a group of accessories mounted thereon showing the application of the improved vibration suppressing mounting.

Fig. 2 is an elevational view of an accessory such as the generator shown in Fig. 1, a portion being broken away and shown in section to better illustrate the construction of the improved mounting for securing the accessory to the engine.

Figure 4:
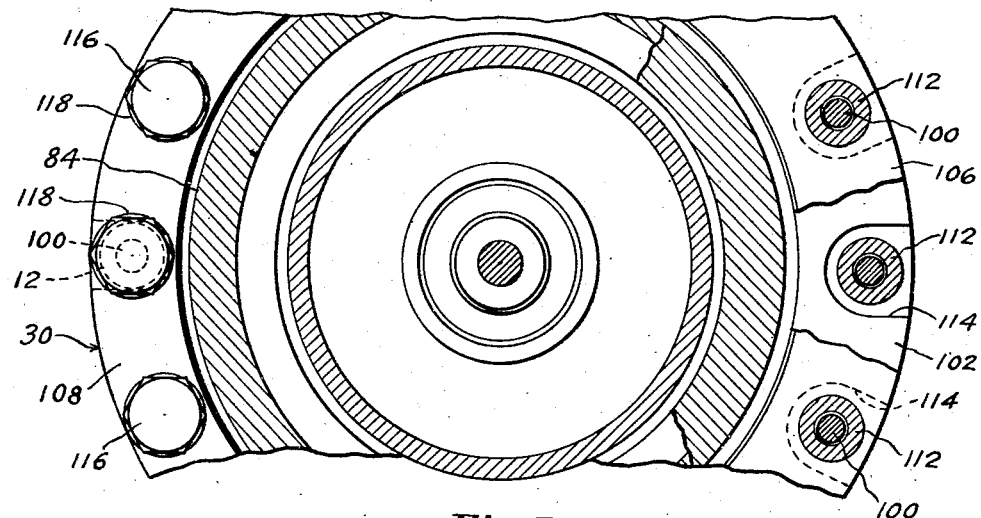
Fig. 4 is a transverse sectional view on the line 4—4 of Fig. 3.

Considerable difficulty has heretofore been experienced in maintaining accessories, particularly those involving considerable mass, such as carburetors, magnetos and generators, upon engines, such as airplane engines, subject to relatively large and complex vibrational movements. The vibrational forces have tended to disrupt the connections between the engine and such accessories and special difficulty has been experienced in those cases where some mode of power plant vibration is at a frequency which is near the natural frequency of a particular engine accessory vibrating with respect to the engine.

It is among the objects of the present invention to provide an accessory mounting which will lower the natural frequencies of vibration of accessories with respect ot the engine and will absorb a sufficient amount of the vibrational energy between the engine and the accessory so that the accessory mounting is not unduly strained when the accessory is vibrating at its natural frequency and the amplitudes of the vibrational movements of the engine are also somewhat reduced by the absorption of vibrational energy in the accessory mounting.

Referring to the drawings in detail and particularly to Fig. 1, the numeral 10 generally indicates an engine such as a radial air-cooled aircraft engine. Such an engine has been illustrated for convenience in disclosing the invention but it is to be understood that the invention is not limited to any particular type of engine or accessory but may be utilized in any case where its principles advantageously apply.

The engine illustrated has a crankcase section 12 carrying a plurality of cylinders, such as is indicated at 14, and having attached thereto a blower section 16, an accessory section 18, and a front section 20 from which projects a drive shaft 22 carrying an aeronautical propeller 24.

The engine accessory section carries a number of accessory devices such as the carburetor 26, the magneto 28, the starter 30 and the generator 32.

While the improved vibration suppressing mounting may be applied to any or all of the engine accessories, it has been illustrated in connection with the generator, starter and carburetor as these particular illustrations are believed to be a sufficient disclosure of the principles of the invention.

The generator 32, as particularly illustrated in Fig. 2, has a casing 34 which includes the rotatable armature 36 carried by the shaft 38 supported at its end adjacent the engine by an antifriction bearing 40 mounted in an end plate 42 secured to the end of the casing 34. Outside of the end plate 42 the shaft 38 carries a disc member 44 which constitutes one part of a flexible coupling, generally indicated at 46, which comprises a second disc member 48 on an engine driven stub shaft 50 in axial alignment with the shaft 38, and a plurality of resilient bodies 52, formed of rubber or some similar resilient material, torsionally interconnected between the discs 44 and 48.

The resilient bodies are spaced from both of the discs 44 and 48 in such a manner that, while providing a cushioned torsional connection between the engine driven shaft 50 and the generator shaft 38, they permit freedom of angular movements of the two shafts so that the generator may have a universal movement on the cushion mounting without any undesirable consequences resulting from the consequent misalignment of the generator shaft with the engine drive shaft.

A pad 54 is mounted on the engine accessory section surrounding the shaft 50, by suitable means such as the cap screws or bolts 56, and may be provided with a circular concentric boss 58 fitting into a centering well 60 provided in the surface of the engine accessory section surrounding the shaft 50. On its outer surface the pad member 54 is provided with a substantially flat outer annular portion 62 provided with holes for the bolts 56 and screw threaded apertures for screws 64, the purpose of which will presently appear, and within the annular portion 62, with a boss 66 having a generally frustro-conical or partly spherical surface surrounding the aperture through which the shaft 50 extends and concentric therewith. This partly spherical surface is preferably shaped to conform to the surface of a sphere 67 having its center at or near a nodal point 69 of vibratory movement of the engine.

An annular member or pedestal 68 is secured to the end of the generator 32 over the end plates 42, by suitable means such as the screws or bolts 70, and comprises an annular portion 72 substantially perpendicular to the axis of the shaft 38 and a second annular boss or flange 74 underlying and spaced from the portion 72 and having surfaces parallel to the surface of the boss 66 of the pad 54. An annular cushion 76 of rubber, or some similar resilient material, is disposed between the outer convex surface of the boss 66 of the pad 54 and the adjacent concave surface of the boss 74 of the pedestal 68 and preferably bonded to one or both of these surfaces, and an annular member 78 of a suitable elastic material such as steel is secured to the pad 54 by the bolts 56 and screws 64 and has a portion overlying the annular convex surface of the portion 74 of the pedestal 68 and parallel thereto. An annular ring 80 of friction material is disposed between the member 78 and the adjacent convex surface of the pedestal 68 and is secured to the member 78 by suitable means, such as the rivets 82. The pressure of the friction material 80 on the portion 74 is adjusted by controlling the thickness of the cushion 76 and the shape of the member 78 so that when the screws 64 and 56 are pulled down tight a desired friction coefficient between the members 68 and 78 can be obtained.

With this arrangement the resilient cushion 76 permits a limited amount of relative movement between the engine and the accessory which movement is frictionally resisted by the body of friction material 80 so that a large amount of the energy of the vibrational forces transmitted from the engine to the accessory is absorbed by the friction material and dissipated in the form of heat. This dissipation of vibrational energy not only reduces the intensity of the vibrational forces between the engine and the accessory but also materially reduces the amplitude of the vibrational movements of the engine and thus provides secure mounting for the accessory which suppresses the vibration of the accessory with respect to the engine and also the amplitude of engine vibration.

Figure 3:
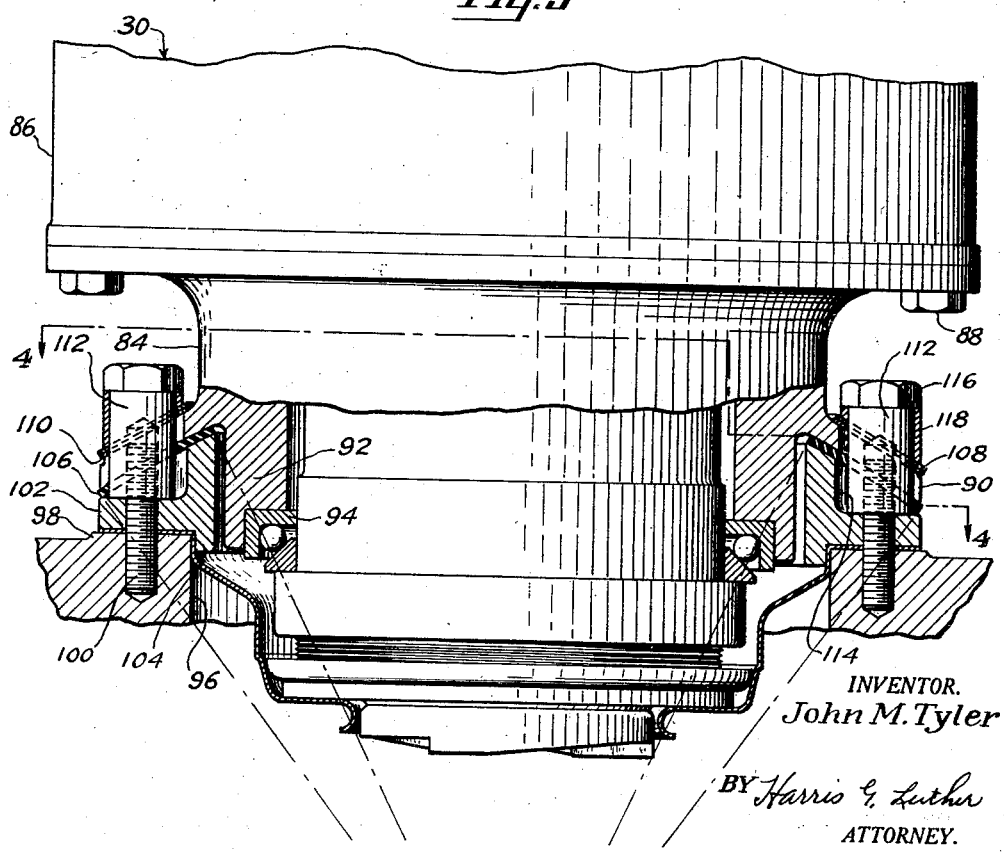
Fig. 3 is an elevational view of a fragmentary portion of the engine starter, a portion being broken away and shown in section to illustrate the application of the improved flexible mounting to the connection between the starter and the engine.
Figure 5:
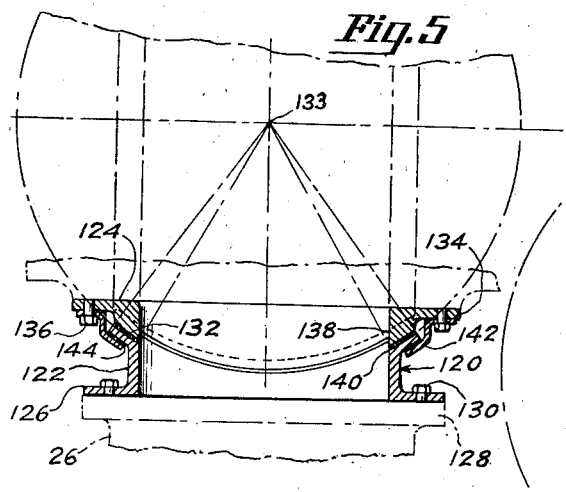
Fig. 5 is a longitudinal sectional view through an adapter used to secure the carburetor to the blower section of the engine crankcase showing the application of the improved flexible connection for securing the carburetor to the engine, the section being on the line 5—5 of Fig. 7.
Figure 6:
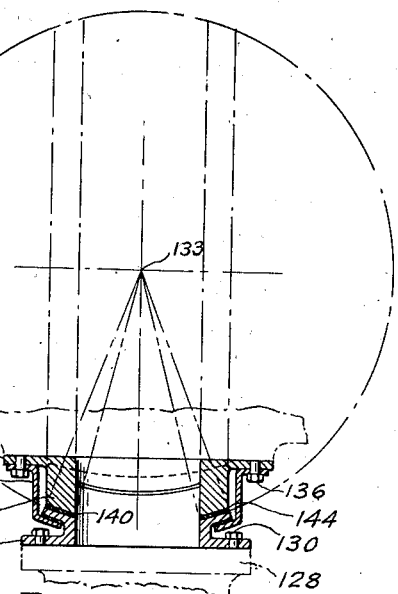
Fig. 6 is a transverse sectional view of the adapter shown in Fig. 5 on the line 6—6 of Fig. 7.
Figure 7:
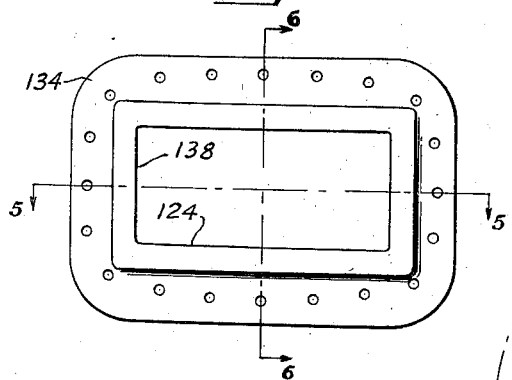
Fig. 7 is a bottom plan view of the engine attached portion of the adapter used to secure the carburetor to the blower section of the engine crankcase.

The mounting for the engine starter 30 is particularly illustrated in Figs. 3 and 4. In this arrangement a pedestal 84 is connected to the end of the starter casing 86 by suitable means, such as the cap screws 88 passing through an annular flange provided at the end of the pedestal and into the end of the casing. This pedestal is provided intermediate its length with an outwardly extending annular flange 90 having a generally frustroconical surface on that side adjacent the starter and a partly spherical concave surface on the side thereof remote from the starter. Beyond the flange the pedestal is provided with an annular boss 92 having an end recess which receives the outer race 94 of the starter end bearing. The engine crankcase is provided with an aperture 96, through which the starter projects, surrounded by a boss 98 provided with spaced screw threaded apertures for the starter hold down studs 100. Overlying the boss 98 there is an annular pad 102 having a centering boss 104 fitting within the aperture 96 and a partly spherical convex surface opposed to the concave surface of the flange 90. A cushion 106 of resilient material, such as rubber, is interposed between the convex surface of the pad 102 and the concave surface of the flange 90 to provide a resilient mounting for the starter 30. A generally frustro-conical friction member 108, preferably formed of spring steel or some similar flexible material, carrying a lining 110 of friction material is placed upon the flange 90 with the friction material in contact with the substantially frustro-conical surface of the flange. This member 108 is apertured to receive the cylindrical nuts 112 which are threaded upon the studs 100 to clamp the annular pad 102 to the engine crankcase. The flange 90 is provided with recesses 114, particularly illustrated in Fig. 4, surrounding and somewhat larger than the cylindrical portions of the nuts 112 so that the flange may have a slight amount of rotational movement in either direction from its neutral position, illustrated in Fig. 4 before one side of each recess comes in contact with the corresponding cylindrical nut 112. This construction, while allowing a desired amount of possible freedom and universal movement of the starter relative to the engine crankcase, provides a positive torque limit stop for the starter so that the resilient cushion 106 does not have to carry the entire starting load. The nuts 112 are provided with head portions 116 projecting annularly somewhat beyond the respective cylindrical portions, and tubular spacer members 118 having diagonal ends are interposed between the heads 116 and the member 108 to press the friction member firmly down on the outer surface of the flange 90. The parts are so designed and dimensioned that when the nuts 112 are screwed firmly down on the flange portion of the member 102 the proper amount of pressure will be exerted on the friction member to secure the desired frictional damping of the starter relative to the engine crankcase.

The flexible mounting for the carburetor 26 is particularly illustrated in Figs. 5 to 11, inclusive.

It has been found convenient in practice to space the carburetor from the engine crankcase by means of an adapter, generally indicated at 120 in Fig. 1, in order to avoid difficulties in securing proper alignment of the bolt apertures in the carburetor attaching flange with the apertures in the engine crankcase and also to provide accommodations for attaching different models of carburetors to a particular engine and also, in some cases, to retard heat transfer between the engine crankcase and the carburetor by spacing the carburetor a slight distance away from the engine crankcase. Obviously the adapter 120 may be made of some material of relatively poor heat conducting properties provided it is sufficiently strong to securely connect the carburetor with the engine. In the form of the invention illustrated, the flexible mounting for the carburetor is incorporated entirely within the adapter 120 and this adapter has been illustrated in considerable detail in Figs. 5 to 11, inclusive.

Figure 9:
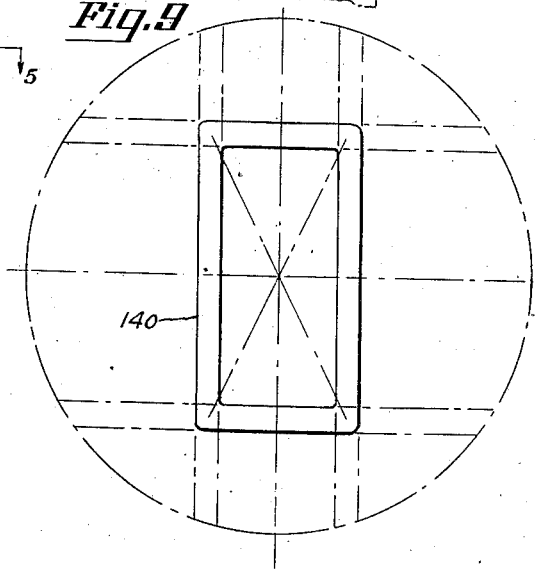
Fig. 9 is a plan view of the resilient cushion interposed between the two parts of the adapter.
Figure 8:
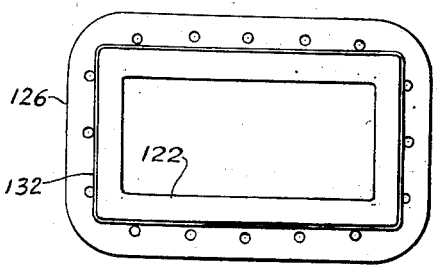
Fig. 8 is a top plan view of the carburetor attached portion of the adapter shown in Fig. 7.
Figure 10:
Fig. 10 is a side-elevational view of the resilient cushion shown in Fig. 9.
Figure 11:
Fig. 11 is an end elevational view of the resilient cushion shown in Fig. 9.

A carburetor for an engine such as that illustrated, is usually provided with a rectangular opening connected with the engine crankcase and is provided with an outwardly extending flange surrounding this opening and also provided with suitable apertures for attaching screws which connect the carburetor to the engine or to the adapter interposed between the engine and the carburetor. In the arrangement illustrated, the adapter is formed in two separate parts, as indicated at 122 and 124. The part 122 is generally rectangular in plan view, as is particularly illustrated in Fig. 8, and is provided at one end with an external flange 126 which overlies the carburetor attachment flange 128 and is secured thereto by suitable means, such as the cap screws 130. At its end opposite the flange 126 the part 122 is provided with a second flange 132 having a generally convex frustro-conical surface facing the flange 126 and a concave partly spherical surface on the opposite side thereof. As is particularly illustrated in Figs. 5 and 6, the flange 132 is curved along the side and end of the member 122 to provide a concave bearing surface all points of which lie upon the surface of a sphere having a center 133 on the center line passing perpendicularly through the adapter. The portion 124, particularly shown in Fig. 7, has a flange 134 provided with apertures through which extend cap screws 136 for securing this member to the engine crankcase. The member 124 has the same general shape as the member 122 and is provided with a boss 138 extending perpendicularly from the flange 134 and provided with a convex generally spherical surface which matches the upper concave surface of the flange portion 132 of the member 122. A cushion 140 of resilient material, the form of which is particularly illustrated in Figs. 9, 10 and 11, is interposed between the concave surface of the flange 132 and the convex surface of the boss 138 so that the portion 122 of the adapter may have a resiliently resisted freedom of universal movement relative to the portion 124. A member 142 formed of thin metal of resilient characteristics, such as spring steel, is secured to the flange 134 and to the engine by the screws 136 and has a portion adjacent the convex surface of the flange 132 which portion carries a layer 144 of friction material in contact with the convex surface of the flange 132. The member 142 is so shaped that when the screws 136 are tightened down the necessary pressure is applied to the friction material to provide the desired frictional damping effect on the member 122.

Since no portion of the carburetor rotates relative to the engine a torque limit stop is not necessary, the main problem being here to provide a resilient connection which will give a universal freedom of movement to the generally rectangular shaped portion connecting the carburetor to the engine.

It is to be noted that the convex or friction surface of the flange 132 follows the contour of the concave surface of this flange and also follows in general the contour of the portion of the surface of a sphere intersected by the flange 132 but the surface is preferably straight along the width of the strip of friction material 144 rather than curved to conform to a true partly spherical shape.

While a suitable mechanical embodiment has been hereinabove described and illustrated in the accompanying drawings for the purpose of disclosing the invention, it is to be understood that the invention is not limited to the particular embodiment so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. A vibration suppressing mounting for securing a supported body to a supporting body subject to vibrational movements comprising, a convex surface on one of said bodies, a concave surface on the other of said bodies, a convex surface on said other body disposed in juxtaposition to said concave surface thereon, a resilient cushion between the convex surface on said one body and the concave surface on said other body, and friction means secured to said one body and bearing on the convex surface on said other body.

2. The arrangement as set forth in claim 1 in which said convex and concave surfaces are annular surfaces surrounding substantially central apertures.

3. A vibration suppressing mounting for securing a supported body on a supporting body comprising, a pad on said supporting body, a pedestal on said supported body, a convex surface on said pad, a complementary concave surface on said pedestal, a resilient cushion between said complementary surfaces, and means frictionally resisting relative movement between said supporting body and said supported body securing said pedestal to said pad in position to maintain said resilient cushion under compression.

4. A vibration suppressing mounting for securing a supported body on a supporting body comprising, a pad on said supporting body having a substantially central aperture, an annular convex surface surrounding said aperture, a pedestal for carrying said supported body having a substantially central aperture, a concave and a convex surface surrounding said pedestal aperture, a resilient cushion between the convex surface on said pad and the concave surface on said pedestal, and friction means secured to said pad and bearing on the convex surface on said pedestal.

5. A vibration suppressing mounting for securing a supported body to a supporting body subject to vibrational movements comprising, a first surface of convex form associated with one of said bodies, a second surface of concave form associated with the other of said bodies in juxtaposition to said first surface, a resilient cushion disposed between and separating said first and second surfaces, a third surface of convex form associated with said other body and in juxtaposition to said first surface and said second surface, and a friction member secured to said one body and bearing on said third surface.

6. A vibration suppressing mounting for securing a supported body to a supporting body subject to vibrational movements comprising, a boss on said supporting body having a generally annular portion of its outer surface shaped to conform to the surface of a sphere having its center near the nodal point about which said vibrational movements take place, a boss on said supported body having a generally annular portion of its surface remote from said supported body shaped to conform to said spherical surface, a cushion of resilient material between said bosses, a generally annular convex surface on the supported member boss in juxtaposition to said spherically shaped surfaces, and a generally annular retaining member secured to said supporting body in juxtaposition to said convex surface and having frictional engagement therewith.

7. A vibration suppressing mounting for securing a supported body to a supporting body subject to vibrational movements comprising, a first surface of convex form associated with one of said bodies, a second surface of concave form associated with the other of said bodies and in juxtaposition to said first surface, a resilient cushion disposed between and separating said first and second surfaces, a third surface of convex form associated with said other body and in juxtaposition to said concave surface, and a friction member secured to said one body and surrounding and in juxtaposition to said third surface.

8. A vibration suppressing mounting for securing a supported body having a rotatable part to a supporting body having a shaft connectible with said rotatable part comprising, an annular resiliently cushioned, friction damped connection surrounding said shaft between said supported and supporting bodies, and a positive torque stop between said bodies to limit rotational movements of said supported body relative to said supporting body and relieve said resilient mounting from torque loads above a predetermined value.

9. A vibration suppressing mounting for securing a supported body having a rotatable part to a supporting body having a shaft connectible with said rotatable part comprising, an annular resiliently cushioned, friction damped connection between said supporting and supported bodies, and a positive torque stop between said bodies to limit rotational movements of said supported body relative to said supporting body, said connection comprising an annular convex surface on said supporting body, a flange carried by said supported body having a concave surface on the side thereof facing said convex surface on said supporting body and a convex surface on the opposite side thereof, and an annular friction member secured to said supporting body and bearing on the convex surface of said flange.

10. A vibration suppressing mounting for securing a supported body having a rotatable part to a supporting body having a shaft connectible with said rotatable part comprising, an annular resiliently cushioned, friction damped connection between said supported and supporting bodies, and a positive torque stop between said supporting and supported bodies to limit rotational movements of said supported body relative to said supporting body, said connection comprising, an annular convex surface on said supporting body, a flange carried by said supported body having a concave surface on the side thereof facing said convex surface on said supporting body and a convex surface on the opposite side thereof, and an annular friction member secured to said supporting body and surrounding and in juxtaposition to said flange, and said torque stop comprising members passing through apertures in said flange and secured to said supporting body.

11. A vibration suppressing mounting for securing a supported body having a substantially rectangular air passage to a supporting body having a substantially rectangular air opening connectible with said air passage comprising, a boss on said supporting body surrounding said air opening and having an end surface conforming to that portion of the surface of a sphere having its center on the center line passing through said boss intersected by said boss, a flange on said supported body having surfaces of substantially the same shape as the end of said boss, a resilient cushion between said boss and said flange, and a friction member attached to said supporting body and surrounding said flange and bearing against a surface of said flange on the opposite side of said flange from said cushion.

12. An adapter for securing a supported body to a supporting body comprising, a first part of generally rectangular shape having a flange at one end and a convex surface at the opposite end conforming to the surface of a sphere having its center on the center line passing through said part, a second part having a straight flange at one end and a curved flange at the opposite end conforming generally to the surface of said sphere, resilient cushion means between said parts, and a friction member fixed relative to said first part and surrounding said curved flange and bearing against a surface of said flange on the opposite side of said flange from said cushion.

13. In combination, a supporting body subject to vibrational movement about a node and having an annular supporting surface which lies substantially in an arc struck about a point located within the body, a second body supported on said supporting body of a mass and mounting stiffness such that it vibrates at a natural frequency near the natural frequency of the vibrations of said supporting body about said node and having an annular surface spaced from said supporting surface and generally parallel thereto, a resilient cushion occupying the space between said surfaces, said supported body also having another annular surface which lies substantially in an arc struck about said node, an annular clamping member carried by said supporting body having a surface overlying said annular surface of said supported body, and friction means pressed by said clamping means into frictional engagement with said last mentioned surface.

14. A vibration suppressing mounting for securing a supported body to a supporting body subject to vibrational movements comprising, co-extensive surfaces arranged around a central aperture and associatable one with said supporting body and the other with said supported body, one of said surfaces being concave and the other convex, a pad of resilient material disposed between and separating said surfaces, a third surface of convex form fixed relative to said concave surface, and a friction member fixed relative to said first mentioned convex surface and bearing on said third surface.

15. In combination, a supporting body subject to wobble vibrations about a node located close to its axis of rotation and having a supporting surface which lies in an arc struck about a center which lies substantially in said axis of rotation, a second body supported on said supporting body of a mass such that it vibrates at a natural frequency near the frequency of said wobble vibrations of said supporting body about said node and having a mounting surface parallel with said supporting surface and spaced apart therefrom, a resilient cushion occupying the space between said surfaces, said supported body also having a second surface struck about said center located parallel with and spaced apart from said mounting surface, a clamping member having an arcuate surface parallel with and spaced apart from said second surface, and friction means pressed by said clamping means into frictional engagement with said last mentioned surface of said supported body for damping the vibrations of the latter with respect to said supporting body and as a result of said damped vibrations of said supported body reducing the amplitude of the vibrations of said supporting body about its node.

16. A vibration suppressing mounting for securing a supported body to a supporting body comprising, a pad on one of said bodies having an annular convex surface, a flange on the other of said bodies having an annular concave surface, an annular convex surface on said flange substantially parallel to said concave surface thereon, an annular resilient cushion between the convex surface on said pad and the concave surface on said flange, and friction means secured to said pad and bearing on the convex surface on said flange.

17. A vibration suppressing mounting for securing a supported body to a supporting body comprising, an attachment plate adapted to be attached to the supporting body, an attachment plate adapted to be attached to the supported body, a convex surface on one of said plates, a complementary concave surface on the other of said plates, a resilient cushion separating said complementary surfaces, and means frictionally resisting relative movement of said plates and securing said plates together in operative association.

18. In combination with a supporting body having a drive shaft and a supported body having a part rotated by said drive shaft, a vibration suppressing mounting for securing the supported body to the supporting body comprising, a part carried by the supporting body having an annular convex surface surrounding the drive shaft, a part carried by the supported body having an annular concave surface surrounding the drive shaft and overlying said convex surface, a cushion of resilient material between said surfaces, said supported body including a portion having a convex surface, an annular member carried by the supporting body in juxtaposition to said convex surface on said supported body, friction material between said annular member and said convex surface on the supported body pressed into frictional contact with said surface by said annular member, and a resilient connection between the drive shaft and said rotatable part constructed and arranged to accommodate angular and linear misalignment of said rotatable part relative to said drive shaft.

JOHN M. TYLER.

REFERENCES CITED

The following references are of record in the file of this patent:

UNITED STATES PATENTS

| Number | Name | Date |
|---|---|---|
| 1,311,020 | Smith | July 22, 1919 |
| 1,639,449 | Baker | Aug. 16, 1927 |
| 2,151,835 | Bugatti | Mar. 28, 1939 |
| 1,874,681 | Woolson | Aug. 30, 1932 |
| 2,132,450 | Wolf | Oct. 11, 1938 |
| 2,317,501 | Tyler | Apr. 27, 1943 |
| 2,059,872 | Hull | Nov. 3, 1936 |
| 2,020,092 | Allen | Nov. 5, 1935 |

FOREIGN PATENTS

| Number | Country | Date |
|---|---|---|
| 704,677 | France | 1931 |